Feb. 6, 1951 G. W. FYLER 2,540,721

KINESCOPE COMBINED WITH SIMULTANEOUSLY ADJUSTABLE LENS AND VIEWING SCREEN

Filed Sept. 9, 1946

INVENTOR.
George W. Fyler,
BY
Mueller and Mason
Attys.

Patented Feb. 6, 1951 2,540,721

UNITED STATES PATENT OFFICE 2,540,721

KINESCOPE COMBINED WITH SIMULTANEOUSLY ADJUSTABLE LENS AND VIEWING SCREEN

George W. Fyler, Lombard, Ill., assignor to Motorola, Inc., a corporation of Illinois Application September 9, 1946, Serial No. 695,627

7 Claims. (Cl. 177—319)

This invention relates to television receivers and in particular to a compact and efficient television projection system.

In the prior art two principal types of television receivers have generally been used, that is, direct viewing receivers in which the screen in the cathode ray tube is viewed directly, and projection type receivers in which the image on the screen of the cathode ray tube is projected through an optical system to a screen or grating. The direct viewing receivers have been objectionable in that a very large cathode ray tube is required to provide an object of sufficient size for easy viewing. The large cathode ray tube makes for high cost of the receiver and also makes a very large receiver cabinet necessary. The projection type receivers, while utilizing a smaller cathode ray tube, have in the past required very large reflectors and lens systems as in the well known Schmidt system, which have made them objectionable for the same reasons as the direct viewing receivers, that is, very large size and high cost. Also the projection type systems have been inefficient requiring extreme brilliance in the cathode ray tube itself to produce an image of sufficient brilliancy for easy observation. Further, the reflective systems such as the Schmidt system have been difficult to focus and have not permitted projection at large distances so that a picture can be projected upon a screen across a room, for example, thereby making it possible for a large number of persons to view the image with ease.

It is, therefore, an object of the present invention to provide an improved television projection system which will be of compact and inexpensive construction.

A further object of this invention is to provide a cathode ray projection tube in which the fluorescent surface is of such configuration that the electron beam will remain substantially in focus on all points thereon without use of special focusing means.

Another object of this invention is to provide a television projection system in which the image is formed on a surface which is of optimum configuration for projection through typical fast refractive lens systems, without the use of a field flattener in the lens system.

A still further object of this invention is the provision of a projection system in which an image of optimum brilliance is formed and is projected through an efficient optical system to provide a brilliant image on a screen.

A feature of this invention is the provision of a television projection system in which the fluorescent surface of the cathode ray tube is concave so that the distance traversed by the electron beam in contacting various points on the surface is substantially the same and the image will be in focus at all points on the surface.

A further feature of this invention is the provision of a television projection system utilizing a cathode ray tube in which the image is formed on the surface of a fluorescent screen impinged by the electrons and in which the image is projected through a fast refractive lens system so that an image of optimum brilliance is formed and efficiently transmitted.

Another feature of this invention is the provision of a cathode ray tube having a concave fluorescent surface on which the image is formed and an optical system including a fast refractive lens system for projecting the image, in which the fluorescent surface is of such curvature and so positioned that it forms an objective surface for the lens system not requiring a field flattener and such that the image is projected with optimum definition and brightness.

Still another feature of this invention is the provision of a television projection system including a cathode ray tube so arranged that an image is formed on a surface thereof which can be projected by a fast refractive lens assembly and in which the lens assembly can be focused to project the image at various distances.

A still further feature of this invention is the provision of a television projection system including a cathode ray tube and an annular lens assembly positioned about the neck of the cathode ray tube so that the entire system will have a maximum outside diameter of about five inches for home receivers (a somewhat larger system may be desirable for theater use).

Further objects, features and advantages will be apparent from a consideration of the following description taken in connection with the accompanying drawings in which.

In practicing my invention I provide a cathode ray tube having a small neck, preferably tapered so as to intercept a minimum amount of light, and utilizing a miniature base electron gun, and a concave screen with the image being formed on the surface of the screen impinged by the electron beam from the gun. An annular optical system is provided about the neck of the tube which receives the image from the screen through an annular window in the tube and projects the image on a large viewing screen or grating. As the fluorescent surface is concave the electron beam remains in good focus over the entire surface thereof, and as the image is formed on the front of the surface, high brilliance and definition are obtainable. The lens system is designed so that the radius of curvature of the best objective surface therefor substantially agrees with the radius of curvature of the fluorescent screen for best focus of the electron beam thereon. A lens capable of being focused over a limited range of distances is used in this system thereby providing a system which is adaptable for use in various arrangements such as are required for projection on a screen at a distance from the television receiver or in arrangements especially adaptable for both day and night viewing.

Figures 1, 2:
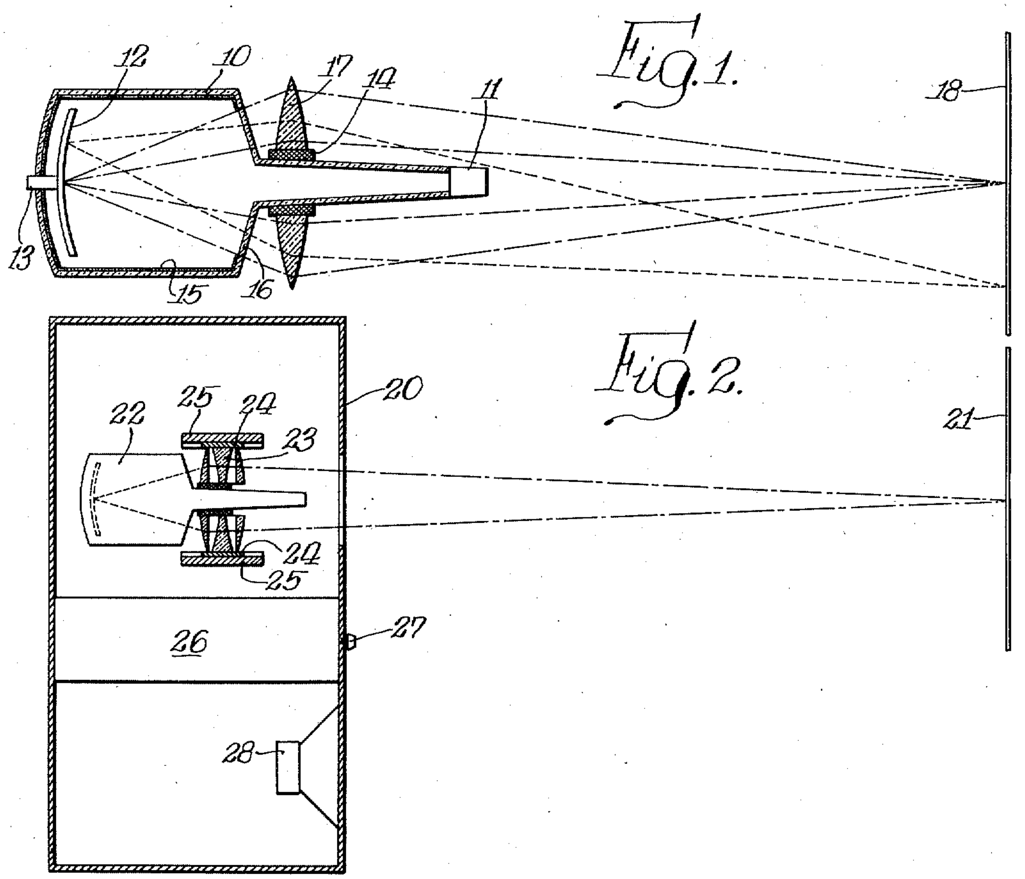
Fig. 1 is a schematic diagram of the television projection system in accordance with this invention.
Fig. 2 illustrates the use of the projection system in accordance with the invention in a television receiver adapted to project an image on a screen at a distance therefrom.

In Fig. 1 there is illustrated a cathode ray tube 10 having an electron gun in a miniature base 11 and including a fluorescent screen 12. The screen 12 also acts as an anode, being connected to a source of potential through terminal 13 which also supports the screen 12 in the tube 10. A deflecting coil 14 is provided about the neck of the tube for causing the electron beam from the electron gun 11 to scan the screen 12 and produce an image thereon. The deflecting coil 14 is so constructed and positioned that it does not interfere with projection of the image. The screen has a concave fluorescent surface thereon which is of such curvature that the distance traversed by the electron beam from the gun to all points on the screen during scanning is substantially the same, to thereby facilitate keeping the electron beam in focus on all points of the screen. A light absorbing coating 15 is provided on the interior surface of the tube covering all the surface except an annular window 16 and the neck of the tube. A refractive lens 17 is provided about the deflecting coil on the neck of the tube and arranged to project the image appearing on the fluorescent screen 12 onto a viewing screen such as 18.

The lens 17 is illustrated as a simple refractive lens but it is to be understood that other types of more complicated refractive lens systems may be used. It is well known in the field of optics that fast refractive lens systems will project an image appearing on a concave surface with optimum definition and brightness if the object surface is properly designed. In providing the lens system, the optical effect of the window 16 must be considered. It may be desired in some instances to use the window as the first element of the lens system. In a system as shown in Fig. 1 the curvature of the fluorescent screen 12 provides two distinct advantages, first that the electron beam will travel substantially the same distance to all points on the screen thereby insuring accurate focus on the fluorescent screen 12, and second, the concave screen provides a desirable object surface for projection through a fast refractive lens system not requiring a field flattener. The use of a lens system not requiring a field flattener has the advantage of using fewer components and also the addition of a flattener may result in additional problems in the design of the lens system.

In Fig. 2 the projection system in accordance with Fig. 1 is illustrated in a typical television receiver cabinet 20 which is adapted to project an image across a room onto a wall or screen 21. The cathode ray tube 22 may be similar to the cathode ray tube 10 of Fig. 1 and is not illustrated in detail. A triplet lens 23 is illustrated as an example of one possible lens, and it is apparent that the curvature of the screen and the characteristics of the lens must be designed for the range of distances over which the image is to be projected. The lens is illustrated as supported by mounting 24 which may be moved in a slide 25 so that the lens can be adjusted to focus an image on viewing screen 21 when it is positioned over a limited range of distances from the cabinet of the receiver 20. The cabinet may also house the other components of the television receiver such as a chassis 26 having controls 27 on the front of the cabinet and a loud speaker 28.

Figure 3:
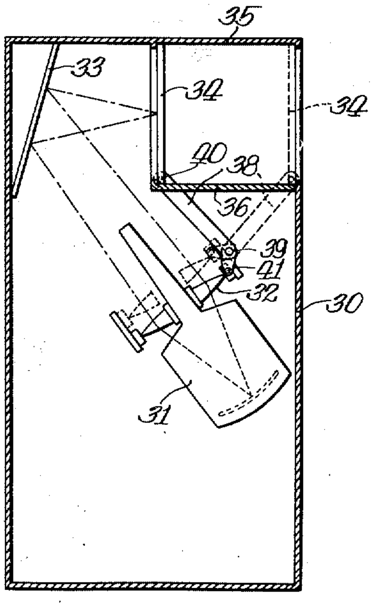
Fig. 3 illustrates the use of the system in accordance with the invention in a television receiver cabinet arranged for both day and night viewing.

Fig. 3 illustrates another application of the projecting system in accordance with the invention to a television receiver in which the viewing screen is provided on the receiver cabinet itself. The cabinet 30 is illustrated as housing a cathode ray tube 31 which is similar to the cathode ray tube 10 of Fig. 1. An optical system including a refractive lens 32 and a mirror 33 is provided for projecting the image from the cathode ray tube onto a screen 34. It is obvious that a fast refractive lens which can be focused is required for this application. The screen 34 is mounted between the top of the cabinet 35 and a partition member 36 within the cabinet and is adapted to be movable from the position shown in solid lines within the cabinet to the position shown in dotted lines at the front of the cabinet. It is apparent that as the screen is moved to the front of the cabinet, the effective distance between the cathode ray tube and the screen is increased so that the image appearing on the screen will be enlarged. In order for the image to be properly focused on the screen in the two positions, the lens 32 must be capable of being adjusted to focus at these two distances. A mechanical arrangement such as lever 38 may be provided for simultaneously moving the screen 34 and adjusting the lens system 32. The lever 38 is pivotally mounted at 39 and is connected to screen 34 at 40 and to the lens at 41. When the screen 34 is moved to the dotted position the lever 38 is also moved to the dotted position causing the lens 32 to be adjusted to focus the image on the screen. It is apparent that the focusing above described can be accomplished by moving the cathode ray tube instead of moving the lens system.

The arrangement of Fig. 3 is of particular advantage in a television receiver for home use in that when the screen is positioned within the cabinet and a smaller image is produced thereon, the image will be more brilliant, and the front of the cabinet will form a hood about the screen to prevent the entry of stray light thereon. This provides an arrangement satisfactory for daytime viewing without making it necessary to greatly reduce the amount of light in the space surrounding the cabinet. When the receiver is being used in a darkened space as for night viewing, the screen can be moved to the front of the cabinet to thus provide a larger image. In such a darkened space, an image which is not so brilliant will be satisfactory and as the image will be larger, it will be more easily seen.

It is, therefore, seen that I have provided a projecting system particularly adaptable for use in television receiving systems which is efficient and may be used in various desirable arrangements. The system is particularly efficient as the projected image is formed on the side of the fluorescent screen which is impinged by the beam of electrons thereby providing optimum brilliance. The curvature of the fluorescent screen is such that a sharp image is produced thereon by the electron beam and that the image may be projected by a refractive lens system with a maximum definition and brightness. The system is not limited by a very shallow depth of focus as are the Schmidt reflective systems previously mentioned.

The position of the lens about the neck of the tube provides a system which may be housed in a space as small as five inches in diameter for home television receivers. A system approximately nine inches in diameter may be desired for theater use. This is to be contrasted to presently used projection systems such as the typical Schmidt systems in which reflectors more than a foot in diameter are required. The small space required for the system makes it particularly applicable for use in small receivers for home use as a complete television system including the projection system in accordance with the invention can be housed in small cabinets which would be of such size to form an attractive piece of furniture in a comparatively small room.

The various embodiments of my invention described are merely illustrative of the invention and it is obvious that various other embodiments can be used without departing from the intended scope of the invention as defined in the appended claims.

I claim:

1. An image projection device comprising a cathode ray tube having an envelope including an elongated neck, a concave fluorescent surface within said envelope, and means within said neck for causing a beam of electrons to sweep through all points on said surface to form an image thereon, and an annular refractive lens system around the neck of said cathode ray tube for projecting the image appearing on said fluorescent surface, said surface having a curvature such that the distance traversed by said beam to all points on said screen is substantially the same and providing an object surface for said lens system so that said image is projected with optimum definition and brightness.

2. An image projection device comprising a cathode ray tube including an envelope having an enlarged portion and an elongated neck extending therefrom, an electron gun in said neck, and a fluorescent screen in said enlarged portion, said screen having a concave surface of such curvature that the distance traversed by the electron beam emitted by said gun to all points on said screen is substantially the same, and an optical system aligned with said cathode ray tube, said optical system including an annular lens positioned about the neck of said tube for projecting the light on said concave surface so that an image appearing on said screen is projected with optimum definition.

3. An image reproducing device comprising a cathode ray tube including an envelope having an enlarged portion and an elongated neck extending therefrom, means forming a concave fluorescent surface in said enlarged portion, and including means in said elongated neck for directing a beam of electrons on said surface to produce an image thereon, a viewing screen adjustably positioned with respect to said cathode ray tube, and an annular refractive lens system positioned about said neck of cathode ray tube to project the image appearing on said fluorescent surface onto said screen, said lens system being capable of being adjusted along said neck of said tube to focus the image on said screen in all the positions thereof.

4. An image reproducing device including a cabinet containing the other components of the device therein, a screen mounted in said cabinet and being movable from a first position substantially flush with the front of said cabinet to a second position in which said screen is within said cabinet and said cabinet forms a hood thereabout, a cathode ray tube within said cabinet and including a concave fluorescent surface and means for directing a beam of electrons on said surface to form an image thereon, an optical system positioned in said cabinet and arranged to project the light from said surface onto said screen to form an image thereon, said optical system including a refractive lens for focusing said light on said screen and a mirror for reflecting said light so that a relatively large effective distance is provided between said surface and said screen in a relatively shallow cabinet, said lens being adjustable to focus said image at various distances, and means for simultaneously moving said screen and adjusting said lens so that when said screen is in said first position an image covering the entire screen is focused thereon, and when said screen is in said second position a smaller image is focused thereon, said hood formed by said cabinet tending to prevent the direction of stray light on said screen to facilitate viewing an image thereon.

5. A television receiver including a cabinet containing the other components of the receiver therein, a screen mounted in said cabinet and being movable from a first position substantially flush with the front of said cabinet to a second position in which said screen is positioned within said cabinet and said cabinet forms a hood thereabout, a cathode ray tube within said cabinet and including a concave fluorescent surface and means for directing a beam of electrons on said surface to form an image thereon, an optical system positioned in said cabinet and arranged to project the image from said surface onto said screen, said cathode ray tube and said optical system being so positioned with respect to said screen and said optical system being so adjustable that when said screen is in said first position an image covering the entire screen is focused thereon and when said screen is in said second position a smaller image is focused thereon, said cabinet tending to prevent the direction of stray light on said screen when in said second position to facilitate viewing an image thereon.

6. A television receiver including a cabinet containing the other components of the receiver therein, a screen mounted in said cabinet and being movable from a first position substantially flush with the front of said cabinet to a second position in which said screen is within said cabinet and said cabinet forms a hood thereabout, a cathode ray tube within said cabinet and including a concave fluorescent surface and means for directing a beam of electrons on said surface to form an image thereon, an optical system positioned in said cabinet and arranged to project the image from said surface onto said screen, said optical system including a refractive lens which is adjustable so that the image can be focused at various distances, means for simultaneously moving said screen and adjusting said optical system so that when said screen is in said first position an image covering the entire screen is focused thereon and when said screen is in said second position a smaller image is focused thereon, the hood formed by said cabinet tending to prevent the direction of stray light on said screen when in said second position to facilitate daytime viewing thereof.

7. An image reproducing device comprising a cathode ray tube, a lens system and a cabinet for housing said cathode ray tube and said lens system, said cathode ray tube including an envelope having an enlarged portion with an elongated neck extending therefrom, a screen in said envelope within said enlarged portion at a position remote from said neck, means within said neck for directing a beam of electrons on said surface, said lens system including an annular lens about said neck for projecting light produced on said screen, said cathode ray tube extending substantially entirely within the path of the light projected from said screen whereby a relatively long light path providing substantial enlargement of the image is provided in a relatively small cabinet.

GEORGE W. FYLER.

REFERENCES CITED

The following references are of record in the file of this patent:

UNITED STATES PATENTS

| Number | Name | Date |
|---|---|---|
| 1,967,161 | Simon | July 17, 1934 |
| 2,201,245 | Ruska | May 21, 1940 |
| 2,203,483 | Banks | June 4, 1940 |
| 2,249,066 | Von Ardenne | July 15, 1941 |
| 2,273,801 | Landis | Feb. 17, 1942 |
| 2,297,443 | Von Ardenne | Sept. 29, 1942 |
| 2,309,788 | Ramberg | Feb. 2, 1943 |
| 2,404,943 | Beshgetoor | July 30, 1946 |
| 2,409,971 | Bennett | Oct. 22, 1946 |
| 2,440,735 | Cawein | May 4, 1948 |
| 2,453,003 | Edwards | Nov. 2, 1948 |
| 2,459,637 | Frihart et al. | Jan. 18, 1949 |

FOREIGN PATENTS

| Number | Country | Date |
|---|---|---|
| 470,623 | Great Britain | Aug. 18, 1937 |
| 477,406 | Great Britain | Dec. 28, 1937 |
| 496,835 | Great Britain | Dec. 7, 1938 |
| 817,271 | France | Aug. 31, 1937 |
| 836,698 | France | Jan. 24, 1939 |
| 214,749 | Switzerland | Aug. 16, 1941 |

OTHER REFERENCES

Principles of Television Engineering by Donald G. Fink, McGraw Hill Book Co., Inc., 1940, pages 342 and 343.